US012560453B2

(12) United States Patent
Jeon et al.

(10) Patent No.: US 12,560,453 B2
(45) Date of Patent: Feb. 24, 2026

(54) PEDESTRIAN TRAJECTORY PREDICTION APPARATUS

(71) Applicant: GWANGJU INSTITUTE OF SCIENCE AND TECHNOLOGY, Gwangju (KR)

(72) Inventors: Hae Gon Jeon, Gwangju (KR); In Hwan Bae, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 378 days.

(21) Appl. No.: 17/680,023

(22) Filed: Feb. 24, 2022

(65) Prior Publication Data

US 2022/0326042 A1    Oct. 13, 2022

(51) Int. Cl.
*G01C 21/00*          (2006.01)
(52) U.S. Cl.
CPC ..... *G01C 21/3889* (2020.08); *G01C 21/3848* (2020.08); *G01C 21/3896* (2020.08)
(58) Field of Classification Search
CPC ............ G01C 21/3889; G01C 21/3896; G01C 21/3848
USPC ........................................................ 701/421
See application file for complete search history.

(56) References Cited

U.S. PATENT DOCUMENTS 11,021,148 B2 *   6/2021   Ghafarianzadeh ...........................
                                                    B60W 30/0956
11,238,729 B1 *   2/2022   Guo ..................... G08G 1/0112

11,300,663 B2 *   4/2022   Wuthishuwong ..... G01S 17/931
2016/0306935 A1 *  10/2016  Rajan ................... A61B 5/7264
2021/0347377 A1 *  11/2021  Siebert ..................... G06N 5/04
2022/0057804 A1    2/2022   Hasegawa et al.

FOREIGN PATENT DOCUMENTS

| CN | 108875505 A | * | 11/2018 | ........ G06K 9/00362 |
| CN | 112163537 A | * | 1/2021 | ............. G06V 10/25 |
| CN | 112347567 A | * | 2/2021 | ........ G01C 21/3484 |
| CN | 113177470 A | * | 7/2021 | ........ G06K 9/00362 |
| CN | 113689470 A | * | 11/2021 | |
| CN | 113920170 A | * | 1/2022 | |
| JP | 2009-019920 A | | 1/2009 | |
| JP | 2018083610 A | * | 5/2018 | .......... B60W 30/095 |
| JP | 2020-095292 A | | 6/2020 | |
| JP | 2020-184135 A | | 11/2020 | |
| WO | WO2020136978 A1 | | 7/2020 | |

OTHER PUBLICATIONS

Priority App. Serial No. KR 10-2021-0042927. Office Action (Dec. 29, 2022).

(Continued)

*Primary Examiner* — Helal A Algahaim
*Assistant Examiner* — John D Holman
(74) *Attorney, Agent, or Firm* — Heidi Eisenhut; LOZA & LOZA, LLP

(57) ABSTRACT

A pedestrian trajectory prediction apparatus includes a waypoint learning unit configured to learn waypoints on a trajectory for a pedestrian from a source to a destination and a corrected trajectory learning unit configured to learn a correction vector for correcting a trajectory connecting the source and the destination.

16 Claims, 5 Drawing Sheets

(56) References Cited

OTHER PUBLICATIONS

Jeongyun et al. "Pedestrian Simulation Model for Path Planning with Anticipation Behavior." J. Korean Society of Transportation 37(5) pp. 410-421 (Oct. 2019).

Mohamed et al. "Social-STGCNN: A Social Spatio-Temporal Graph Convolutional Neural Network for Human Trajectory Prediction." Proceedings of the IEEE/CVF Conference on Computer Vision and Pattern Recognition (CVPR) pp. 14424-14432 (2020).

* cited by examiner

<u>100</u>

180

110 — COMMUNICATION UNIT

120 — INPUT UNIT

130 — LEARNING PROCESSOR

PROCESSOR

MEMORY — 170

OUTPUT UNIT — 150

SENSING UNIT — 140

100

210

260

AI DEVICE

COMMUNICATION UNIT

PROCESSOR

200

LEARNING PROCESSOR — 240

MEMORY — 230

MODEL STORAGE UNIT — 231

Figure 3:
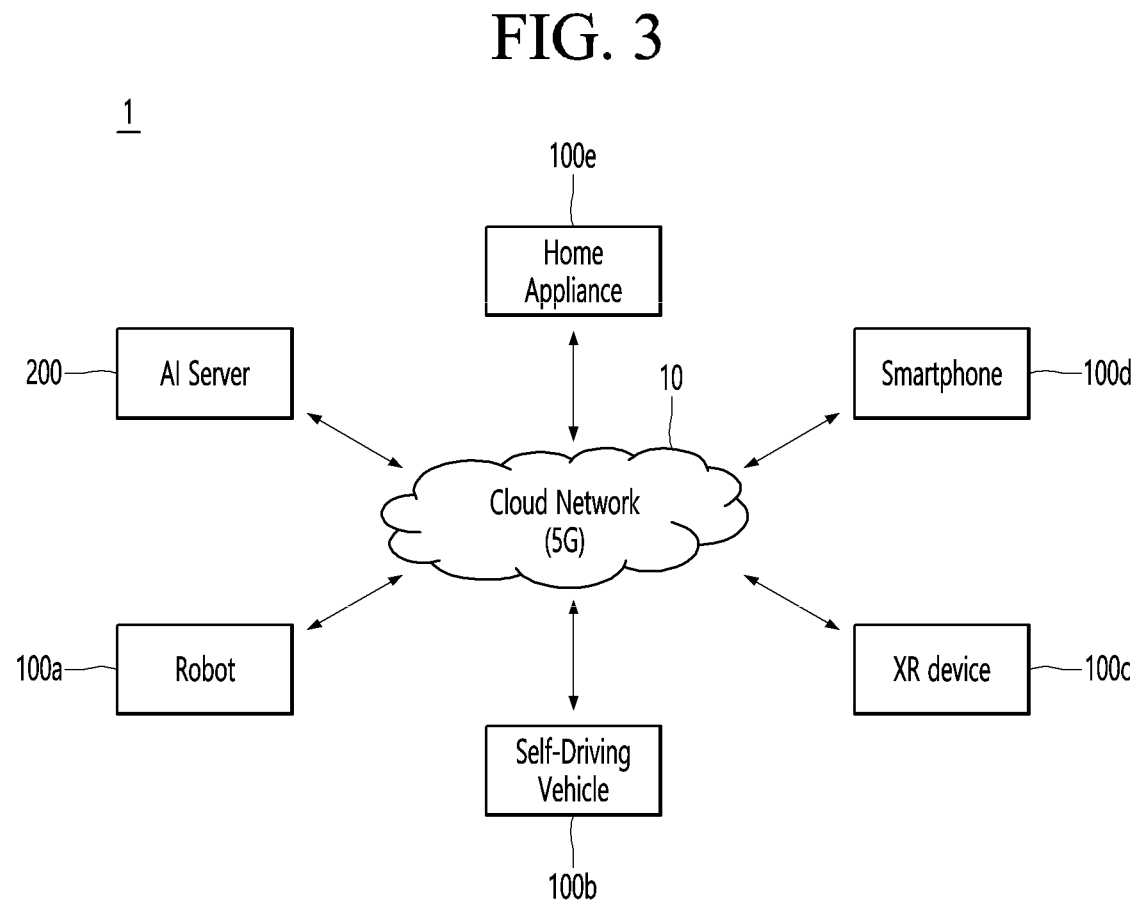

Home Appliance

200 — AI Server

Smartphone — 100d

10

Cloud Network (5G)

100a — Robot

XR device — 100c

Self-Driving Vehicle

100b

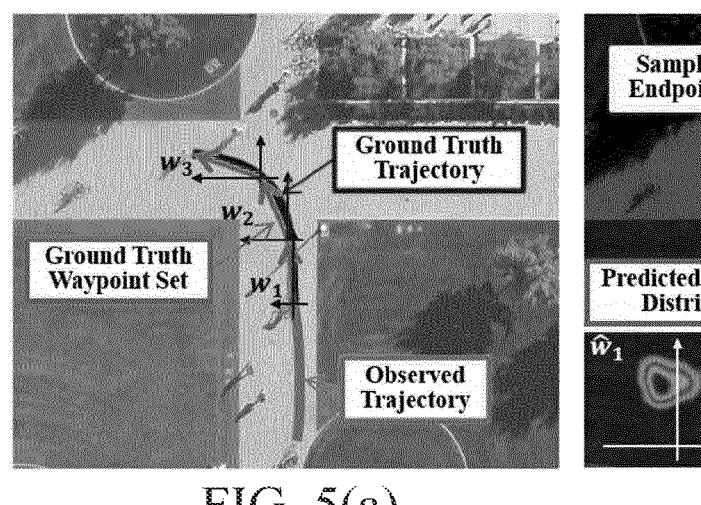
FIG. 5(a)
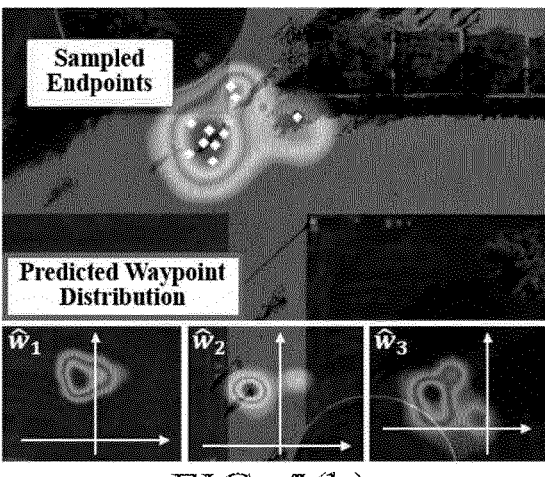
FIG. 5(b)
FIG. 6(a)
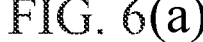
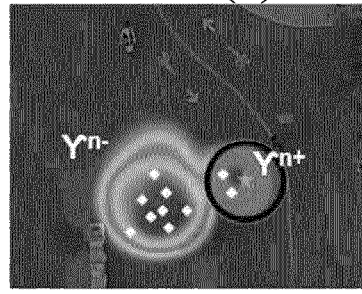
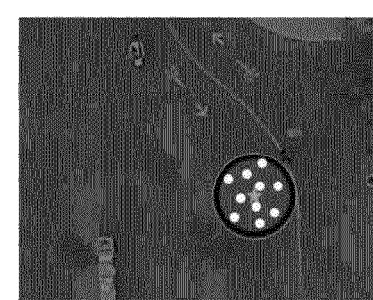
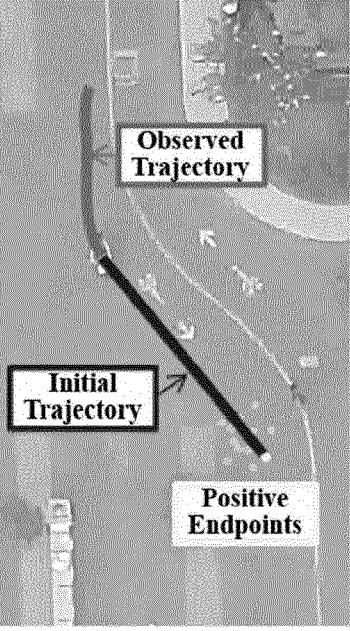
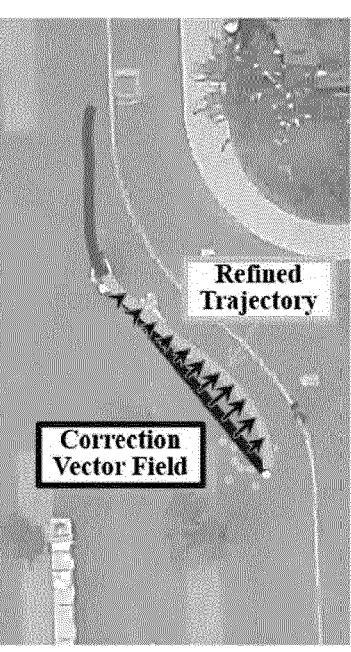
FIG. 6(b)          FIG. 6(c)          FIG. 6(d)

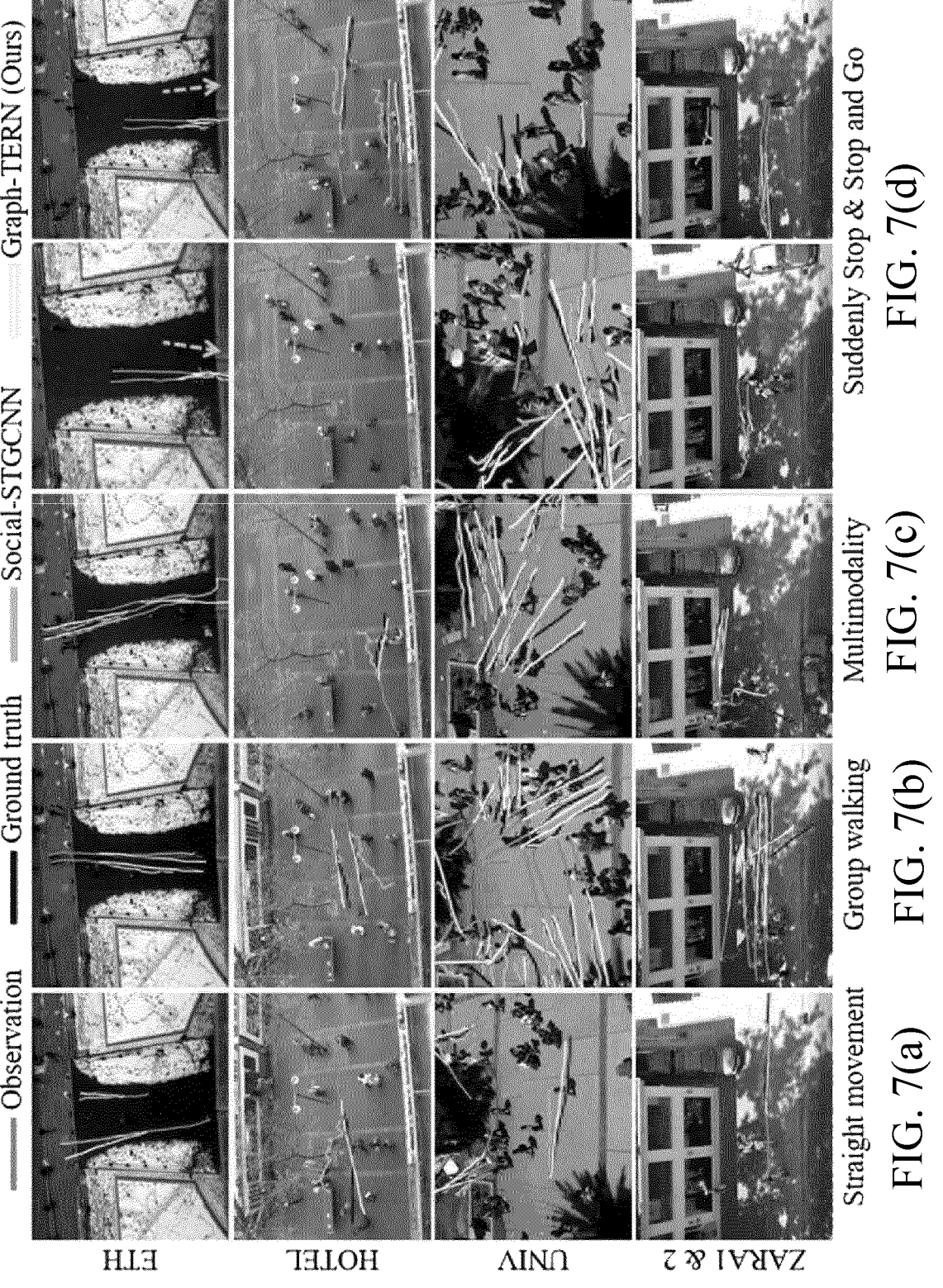
FIG. 7(a)  Straight movement
FIG. 7(b)  Group walking
FIG. 7(c)  Multimodality
FIG. 7(d)  Suddenly Stop & Stop and Go

PEDESTRIAN TRAJECTORY PREDICTION APPARATUS

CROSS-REFERENCE TO RELATED APPLICATIONS

The present application claims priority under 35 U.S.C. 119 and 35 U.S.C. 365 to Korean Patent Application No. 10-2021-0042927 filed on Apr. 1, 2021, which is hereby incorporated by reference in its entirety.

BACKGROUND OF THE INVENTION

Field of the Invention

The present disclosure relates to a pedestrian trajectory prediction apparatus for predicting a walking trajectory of a pedestrian.

Discussion of the Related Art

Artificial intelligence is a field of computer engineering and information technology that research a method for allowing computers to do thinking, learning, self-development or the like that can be done by human intelligence, and means that computers is allowed to imitate human intelligent behavior.

In addition, artificial intelligence does not exist by itself, but is directly or indirectly related to other fields of computer science. Especially, artificial intelligent factors has been introduced in the various field of information technology, and it has been actively attempted to utilize them to solve problems in the field.

On the other hand, techniques for perceiving and learning surrounding environment using artificial intelligence, providing information desired by a user in a desired form, or performing an operation or function desired by the user are being actively studied. An electronic device providing such various operations and functions may be referred to as an artificial intelligence (AI) apparatus.

An artificial intelligence device can predict the trajectory of pedestrians. The artificial intelligence device may be a pedestrian trajectory prediction apparatus. In this case, the artificial intelligence device may be mounted on, for example, a walking robot to guide the walking of the walking robot.

Prior art for predicting a walking trajectory is disclosed in Mohamed, A.; Qian, K.; Elhoseiny, M.; and Claudel, C. 2020. Social-STGCNN: A Social Spatio-Temporal Graph Convolutional Neural Network for Human Trajectory Prediction in In Proceedings of IEEE Conference on Computer Vision and Pattern Recognition (CVPR), hereinafter referred to as Citation 1.

Citation 1 presents a technique using a graph convolutional network (GCN). Citation 1 predicts the trajectory of a pedestrian by using each spatio-temporal graph information. However, Citation 1 does not reflect the movement of pedestrians in response to social norms, so there is a problem in that the prediction of the walking trajectory is inaccurate. In addition, Citation 1 has a problem in that it does not consider an event occurring in an intermediate stage in long-term prediction.

SUMMARY OF THE INVENTION

The present invention proposes an artificial intelligence device for updating features used for predicting a walking trajectory by using the characteristics of the walking trajectory as proposed in the background described above. The artificial intelligence device may predict a walking trajectory.

A pedestrian trajectory prediction apparatus includes a waypoint learning unit configured to learn waypoints on a trajectory for a pedestrian from a source to a destination and a corrected trajectory learning unit configured to learn a correction vector for correcting a trajectory connecting the source and the destination.

According to the present disclosure, it is possible to predict a pedestrian trajectory accurately.

BRIEF DESCRIPTION OF THE DRAWINGS

FIG. 3 illustrates an AI system according to an embodiment of the present disclosure.

FIGS. 5(a) and 5(b) are diagrams showing a set of waypoints and an expected distribution of waypoints as an example.

FIGS. 6(a), 6(b), 6(c), and 6(d) are diagrams illustrating a trajectory correction process.

FIGS. 7(a), 7(b), 7(c), and 7(d) show a view in which the effects of the present disclosure are compared with Social-STGCNN which is a cited reference.

DETAILED DESCRIPTION OF THE PREFERRED EMBODIMENTS

Figure 1:
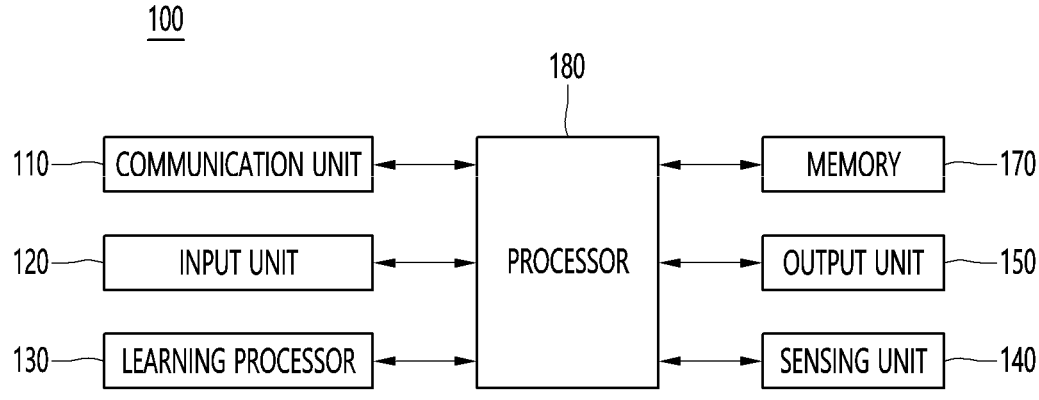
FIG. 1 is a block diagram showing an AI device according to an embodiment of the present disclosure.

Hereinafter, the embodiments disclosed herein will be described in detail with reference to the accompanying drawings, and the same or similar elements are designated with the same numeral references regardless of the numerals in the drawings and their redundant description will be omitted. The suffixes "module" and "unit or portion" for components used in the following description are merely provided only for facilitation of preparing this specification, and thus they are not granted a specific meaning or function. In addition, when it is determined that the detailed description of the related known technology may obscure the gist of embodiments disclosed herein in describing the embodiments disclosed herein in describing the embodiments, a detailed description thereof will be omitted. Further, the accompanying drawings are intended to facilitate understanding of the embodiments disclosed herein, and the technical spirit disclosed herein are not limited by the accompanying drawings. Therefore, the present disclosure should be construed as including all the changes, equivalents, and substitutions included in the spirit and scope of the present disclosure.

The terms coming with ordinal numbers such as 'first', 'second', or the like may be used to denote various components, but the components are not limited by the terms. The terms are used merely for the purpose to distinguish a component from the other component.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present disclosure.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
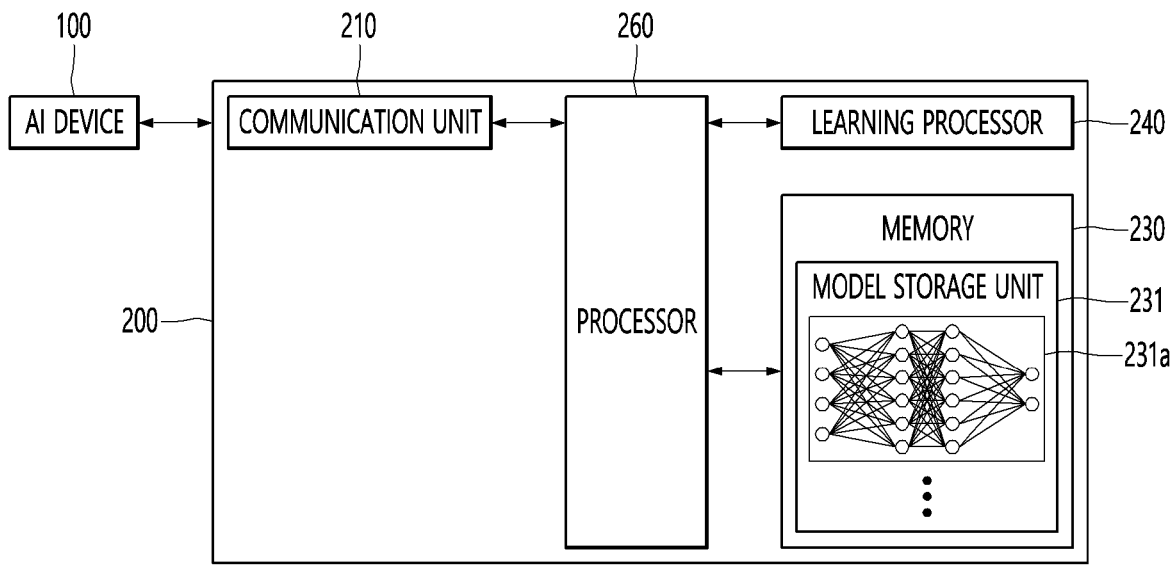
FIG. 2 is a view showing an AI server according to an embodiment of the present disclosure.

FIG. 2 illustrates an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

FIG. 3 illustrates an AI system 1 according to an embodiment of the present disclosure.

Referring to FIG. 3, in the AI system 1, at least one of an AI server 200, a robot 100*a*, a self-driving vehicle 100*b*, an XR device 100*c*, a smartphone 100*d*, or a home appliance 100*e* is connected to a cloud network 10. The robot 100*a*, the self-driving vehicle 100*b*, the XR device 100*c*, the smartphone 100*d*, or the home appliance 100*e*, to which the AI technology is applied, may be referred to as AI devices 100*a* to 100*e*.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100*a* to 100*e* and 200 configuring the AI system 1 may be connected to each other through the cloud network 10. In particular, each of the devices 100*a* to 100*e* and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100*a*, the self-driving vehicle 100*b*, the XR device 100*c*, the smartphone 100*d*, or the home appliance 100*e* through the cloud network 10, and may assist at least part of AI processing of the connected AI devices 100*a* to 100*e*.

At this time, the AI server 200 may learn the artificial neural network according to the machine learning algorithm instead of the AI devices 100*a* to 100*e*, and may directly store the learning model or transmit the learning model to the AI devices 100*a* to 100*e*.

At this time, the AI server 200 may receive input data from the AI devices 100*a* to 100*e*, may infer the result value for the received input data by using the learning model, may generate a response or a control command based on the inferred result value, and may transmit the response or the control command to the AI devices 100*a* to 100*e*.

Alternatively, the AI devices 100*a* to 100*e* may infer the result value for the input data by directly using the learning model, and may generate the response or the control command based on the inference result.

Hereinafter, various embodiments of the AI devices 100*a* to 100*e* to which the above-described technology is applied will be described. The AI devices 100*a* to 100*e* illustrated in FIG. 3 may be regarded as a specific embodiment of the AI device 100 illustrated in FIG. 1.

<AI+Robot>

The robot 100*a*, to which the AI technology is applied, may be implemented as a guide robot, a carrying robot, a cleaning robot, a wearable robot, an entertainment robot, a pet robot, an unmanned flying robot, or the like.

The robot 100*a* may include a robot control module for controlling the operation, and the robot control module may refer to a software module or a chip implementing the software module by hardware.

The robot 100*a* may acquire state information about the robot 100*a* by using sensor information acquired from various kinds of sensors, may detect (recognize) surrounding environment and objects, may generate map data, may determine the route and the travel plan, may determine the response to user interaction, or may determine the operation.

The robot 100*a* may use the sensor information acquired from at least one sensor among the lidar, the radar, and the camera so as to determine the travel route and the travel plan.

The robot 100*a* may perform the above-described operations by using the learning model composed of at least one artificial neural network. For example, the robot 100*a* may recognize the surrounding environment and the objects by using the learning model, and may determine the operation by using the recognized surrounding information or object information. The learning model may be learned directly from the robot 100*a* or may be learned from an external device such as the AI server 200.

At this time, the robot 100*a* may perform the operation by generating the result by directly using the learning model, but the sensor information may be transmitted to the external device such as the AI server 200 and the generated result may be received to perform the operation.

The robot 100*a* may use at least one of the map data, the object information detected from the sensor information, or the object information acquired from the external apparatus to determine the travel route and the travel plan, and may control the driving unit such that the robot 100*a* travels along the determined travel route and travel plan.

The map data may include object identification information about various objects arranged in the space in which the robot 100*a* moves. For example, the map data may include object identification information about fixed objects such as walls and doors and movable objects such as pollen and desks. The object identification information may include a name, a type, a distance, and a position.

In addition, the robot 100*a* may perform the operation or travel by controlling the driving unit based on the control/interaction of the user. At this time, the robot 100*a* may acquire the intention information of the interaction due to the user's operation or speech utterance, and may determine the response based on the acquired intention information, and may perform the operation.

<AI+Self-Driving>

The self-driving vehicle 100*b*, to which the AI technology is applied, may be implemented as a mobile robot, a vehicle, an unmanned flying vehicle, or the like.

The self-driving vehicle 100*b* may include a self-driving control module for controlling a self-driving function, and the self-driving control module may refer to a software module or a chip implementing the software module by hardware. The self-driving control module may be included in the self-driving vehicle 100*b* as a component thereof, but may be implemented with separate hardware and connected to the outside of the self-driving vehicle 100*b*.

The self-driving vehicle 100*b* may acquire state information about the self-driving vehicle 100*b* by using sensor information acquired from various kinds of sensors, may detect (recognize) surrounding environment and objects, may generate map data, may determine the route and the travel plan, or may determine the operation.

Like the robot 100*a*, the self-driving vehicle 100*b* may use the sensor information acquired from at least one sensor among the lidar, the radar, and the camera so as to determine the travel route and the travel plan.

In particular, the self-driving vehicle 100*b* may recognize the environment or objects for an area covered by a field of view or an area over a certain distance by receiving the sensor information from external devices, or may receive directly recognized information from the external devices.

The self-driving vehicle 100*b* may perform the above-described operations by using the learning model composed of at least one artificial neural network. For example, the self-driving vehicle 100*b* may recognize the surrounding environment and the objects by using the learning model, and may determine the traveling movement line by using the recognized surrounding information or object information. The learning model may be learned directly from the self-driving vehicle 100*a* or may be learned from an external device such as the AI server 200.

At this time, the self-driving vehicle 100*b* may perform the operation by generating the result by directly using the learning model, but the sensor information may be transmitted to the external device such as the AI server 200 and the generated result may be received to perform the operation.

The self-driving vehicle 100*b* may use at least one of the map data, the object information detected from the sensor information, or the object information acquired from the external apparatus to determine the travel route and the travel plan, and may control the driving unit such that the self-driving vehicle 100*b* travels along the determined travel route and travel plan.

The map data may include object identification information about various objects arranged in the space (for example, road) in which the self-driving vehicle 100*b* travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100*b* may perform the operation or travel by controlling the driving unit based on the control/interaction of the user. At this time, the self-driving vehicle 100*b* may acquire the intention information of the interaction due to the user's operation or speech utterance, and may determine the response based on the acquired intention information, and may perform the operation.

\<AI+XR\>

The XR device 100*c*, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100*c* may analyzes three-dimensional point cloud data or image data acquired from various sensors or the external devices, generate position data and attribute data for the three-dimensional points, acquire information about the surrounding space or the real object, and render to output the XR object to be output. For example, the XR device 100*c* may output an XR object including the additional information about the recognized object in correspondence to the recognized object.

The XR device 100*c* may perform the above-described operations by using the learning model composed of at least one artificial neural network. For example, the XR device 100*c* may recognize the real object from the three-dimensional point cloud data or the image data by using the learning model, and may provide information corresponding to the recognized real object. The learning model may be directly learned from the XR device 100*c*, or may be learned from the external device such as the AI server 200.

At this time, the XR device 100*c* may perform the operation by generating the result by directly using the learning model, but the sensor information may be transmitted to the external device such as the AI server 200 and the generated result may be received to perform the operation.

\<AI+Robot+Self-Driving\>

The robot 100*a*, to which the AI technology and the self-driving technology are applied, may be implemented as a guide robot, a carrying robot, a cleaning robot, a wearable robot, an entertainment robot, a pet robot, an unmanned flying robot, or the like.

The robot 100*a*, to which the AI technology and the self-driving technology are applied, may refer to the robot itself having the self-driving function or the robot 100*a* interacting with the self-driving vehicle 100*b*.

The robot 100*a* having the self-driving function may collectively refer to a device that moves for itself along the given movement line without the user's control or moves for itself by determining the movement line by itself.

The robot 100*a* and the self-driving vehicle 100*b* having the self-driving function may use a common sensing method so as to determine at least one of the travel route or the travel plan. For example, the robot 100*a* and the self-driving vehicle 100*b* having the self-driving function may determine at least one of the travel route or the travel plan by using the information sensed through the lidar, the radar, and the camera.

The robot 100*a* that interacts with the self-driving vehicle 100*b* exists separately from the self-driving vehicle 100*b* and may perform operations interworking with the self-driving function of the self-driving vehicle 100*b* or interworking with the user who rides on the self-driving vehicle 100*b*.

At this time, the robot 100*a* interacting with the self-driving vehicle 100*b* may control or assist the self-driving function of the self-driving vehicle 100*b* by acquiring sensor information on behalf of the self-driving vehicle 100*b* and providing the sensor information to the self-driving vehicle 100*b*, or by acquiring sensor information, generating environment information or object information, and providing the information to the self-driving vehicle 100*b*.

Alternatively, the robot 100*a* interacting with the self-driving vehicle 100*b* may monitor the user boarding the self-driving vehicle 100*b*, or may control the function of the self-driving vehicle 100*b* through the interaction with the user. For example, when it is determined that the driver is in a drowsy state, the robot 100*a* may activate the self-driving function of the self-driving vehicle 100*b* or assist the control of the driving unit of the self-driving vehicle 100*b*. The function of the self-driving vehicle 100*b* controlled by the robot 100*a* may include not only the self-driving function but also the function provided by the navigation system or the audio system provided in the self-driving vehicle 100*b*.

Alternatively, the robot 100*a* that interacts with the self-driving vehicle 100*b* may provide information or assist the function to the self-driving vehicle 100*b* outside the self-driving vehicle 100*b*. For example, the robot 100*a* may provide traffic information including signal information and the like, such as a smart signal, to the self-driving vehicle 100*b*, and automatically connect an electric charger to a charging port by interacting with the self-driving vehicle 100*b* like an automatic electric charger of an electric vehicle.

\<AI+Robot+XR\>

The robot 100*a*, to which the AI technology and the XR technology are applied, may be implemented as a guide robot, a carrying robot, a cleaning robot, a wearable robot, an entertainment robot, a pet robot, an unmanned flying robot, a drone, or the like. The robot 100*a*, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

The AI server 200 may include the configuration of the AI device 100 described with reference to FIGS. 1 to 3 and perform functions of the AI device 100.

The electronic device 300 may include the configuration of the AI device 100 described with reference to FIGS. 1 to 3 and perform functions of the AI device 100.

The AI device described herein may be the AI server 200 or the electronic device 300.

Hereinafter, the AI device may act as a pedestrian trajectory prediction apparatus.

The pedestrian trajectory prediction apparatus may act as resources for predicting a walking trajectory of a person in a plurality of electronic devices including robots and autonomous driving devices.

There may be many representative behavioral patterns of pedestrians. For example, the behavioral patterns may include a pattern according to interaction between a person and a person and between a person and a group. The behavioral patterns may include three patterns: [1] Collision avoidance: a pedestrian avoids collision when there is a person or group on the pedestrian's walking trajectory, [2] Joining group: a pedestrian moves toward and joins a group to which the pedestrian belongs, and [3] Interaction: a pedestrian stops, joins a group and interacts with the group.

As another example, the behavioral patterns may include a pattern according to the interaction between a person and the whole crowd. For example, [4] walking at the same pace, a pedestrian walking with a large crowd in the periphery. This interaction between pedestrians can be understood as following social norms and actions. It is important that the GCN reflects the behavioral patterns of pedestrians.

On the other hand, in GCN, a issue is to configure and connect what kind of edges between nodes which are pedestrians respectively. As a simple example, when a high-edge connection is provided in a case where the distance between two pedestrians is close, a person closest to the pedestrian is determined as a main object of interest. In this case, the person of interest can be avoided. This can be solved for the situation corresponding to [1] among the four behavioral patterns as described above. However, it leads to a prediction result that is not restored in the direction of an original destination after avoidance. In addition, in [2] and [3] above, the prediction results of joining with another person and avoiding the target without interacting with the target may appear frequently. Even in [4], the connection to other pedestrians farther away is weak, which may lead to a prediction result of walking at a different speed without recognizing the surrounding people.

<GCN: Graph Convolutional Network>

The graph convolutional network may update features for each layer using Equation 1.

$$H^{(l+1)} = \sigma(\hat{A} H^{(l)} W^{(l)}) \qquad \text{[Equation 1]}$$

where H is the features of all nodes. σ is the nonlinear activation function. In this embodiment, PReLU was used. A is an adjacency matrix. W is a learnable weight matrix for each layer. l is the index of a layer. The nodes may refer to all pedestrians. The connection of at least two of the nodes may be referred to as a graph. The connection between two nodes of the graph may be referred to as an edge. The English characters in the specification may have the same meaning.

For other information related to the graph convolutional network, reference may be made to the contents of Citation 1. For the understanding of the present disclosure, the description of Citation 1 is incorporated herein by reference.

Using [Equation 1] above, it is possible to update features for pedestrian trajectory prediction using GCN.

According to [Equation 1], [1] Collision avoidance, [2] Joining group, [3] Interaction, and [4] Walking at the same pace cannot be updated correctly.

This embodiment proposes an artificial intelligence device for predicting a pedestrian trajectory by reflecting the walking characteristics of the pedestrian.

Figure 4:
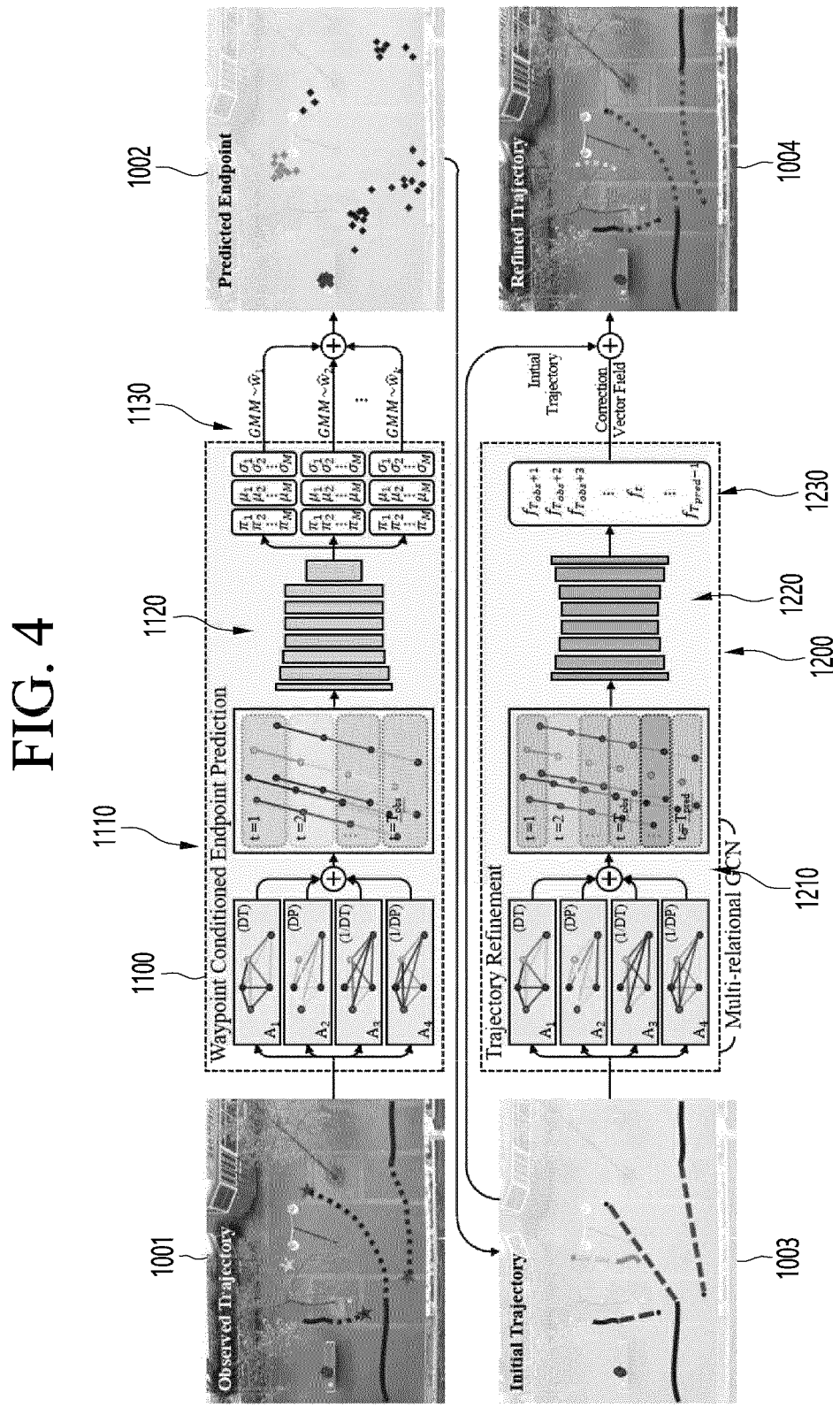
FIG. 4 is a diagram for describing an AI device according to an embodiment of the present disclosure.

FIG. 4 is a diagram for describing an AI device according to an embodiment of the present disclosure.

Referring to FIG. 4, the AI device according to the embodiment may include a first learning unit 1100 and a second learning unit 1200.

The first learning unit 1100 may learn waypoints. Here, the waypoints may refer to points through which a pedestrian passes in the process of moving from a source (observation point)(obs) to a destination (predicted end point) (pred). The destination may be obtained by adding the waypoints.

The second learning unit 1200 may learn a correction vector that provides a correction path. The correction path may refer to a path obtained by modifying a straight path that most closely connects the source and the destination with a correction vector.

Hereinafter, the AI device will be described in more detail.

First, the waypoint learning unit 1100 will be described.

An input image 1001 may be input as learning data. The input image may be a video in which a plurality of pedestrians are moving. The pedestrian's future walking trajectory may be divided into a plurality of sections. The future trajectory may refer to a route from the source to the destination at a specific point in time. The point at which each section is divided may be called a waypoint. The waypoint may be defined by {Equation 2}.

$$W^n = \left\{ w_k^n = p_{T_{obs}+T \times k}^n - p_{T_{obs} \tau \times (k-1)}^n \right\} \quad \text{[Equation 2]}$$

$$\text{for } \forall k \in \{1, \dots, K\}, \tau = \frac{T_{pred} - T_{obs}}{K}$$

where W is a waypoint, n is a pedestrian, K is the number of waypoints, T is a time point, and Tau may mean a time interval. Here, K may be set to 3.

By [Equation 1], coordinates of a plurality of pedestrians including a waypoint may be extracted.

A spatio-temporal multi-relational pedestrian graph may be created based on the coordinates. The features may be updated using the multi-relational pedestrian graph. The updating of the features may include updating a plurality of complementary spatio-temporal features after separating them into temporal and spatial axes.

The waypoint learning unit 1100 may include a graph convolutional network (GCN) 1110 that is trained using the pedestrian graph. The GCN 1110 may be referred to as a multi-relational GCN in the process of updating features on the spatial axis. An embodiment may include four features. The four features may include relative displacement information (DP) between pedestrians, the reciprocal of the relative displacement information between pedestrians (1/DP), distance information (DT) between pedestrians, and the reciprocal of the distance information between pedestrians (1/DT). Here, the distance information may be Euclidean distance information.

Information may be normalized by including each information of the feature and the reciprocal of the information. In other words, special information of a place where the learning data is extracted, that is, a place where a video is taken, may be normalized.

The multi-relational GCN may be expressed by [Equation 3].

$$H' = \sigma\left( \sum_{r=1}^{R} \hat{A}_r H W_r \right) \quad \text{[Equation 3]}$$

where R may denote the multi-relationship. The elements of R include relative displacement information (DP) between pedestrians, the reciprocal of relative displacement information between pedestrians (1/DP), distance information (DT) between pedestrians, and the distance between pedestrians. It may include the reciprocal of information (1/DT).

The multi-relational GCN 1110 is different from Citation 1 dealing with only the relative displacement information. According to this technique, [2] joining group, and [3] interaction have been predicted well. For example, it can be well predicted that pedestrians join and interact with a group.

The features separated by the multi-relational GCN 1110 and updated on the spatial axis may be merged in the time axis by a multi-relational merging unit 1120. The multi-relational merging unit 1120 may be implemented as a 2D convolutional layer (CNN) having a 3*1 filter along a channel axis. Of course, other means of merging features may not be excluded.

A social relationship between the pedestrians may be collected using the GCN and the CNN.

Thereafter, a two-dimensional coordinate prediction unit 1130 may probabilistically infer the waypoint. A multivariate Gaussian mixture model may be used to probabilistically infer the coordinates of the waypoint. In this case, the coordinates of the waypoint may use a Mixture Density Network (MDN) that outputs a multivariate gaussian mixture model.

FIGS. 5(*a*) and 5(*b*) is a diagram showing a set of waypoints and an expected distribution of waypoints as an example.

FIG. 5(*a*) shows predicted waypoints. Here, the predicted waypoints are based on displacement and have three waypoints. FIG. 5(*b*) shows distribution of waypoints predicted in each section and a predicted destination.

The predicted destination 1002 may be a final endpoint provided by connecting the waypoints in time series.

The predicted destination 1002 may be provided in plurality. The destination may include a plurality of the destinations in different modes, or the like. For example, 20 destinations may be provided.

As seen in the above description, the present disclosure may perform learning in consideration of the concept of waypoints. Accordingly, it is possible to more accurately predict the endpoint by reflecting the interaction of multiple pedestrians and the walking trajectory of each pedestrian when the destination (endpoint) is predicted.

An initial prediction trajectory 1003 may be provided by linearly interpolating the source and the destination. The initial prediction trajectory may be modified by a corrected trajectory learning unit 1200. The corrected trajectory learning unit 1200 may be separated from the waypoint learning unit 1100.

The destination used in the initial prediction trajectory may be corrected. The destinations may be obtained by taking only a sample that is within a predetermined distance from a ground truth among the predicted destinations. The destinations may be used by arbitrarily adding samples within a predetermined distance from the destination, which is the ground truth. For example, 20 destinations may be used.

The corrected trajectory learning unit 1200 may include a multi-relational GCN 1210 and a multi-relational merging unit 1220, similarly to the waypoint learning unit 1100. The multi-relational GCN 1210 may be provided as a GCN, and the multi-relational merging unit 1220 may be provided as a CNN. However, the corrected trajectory learning unit may take all trajectories of the initial prediction trajectory as a learning target. The corrected trajectory learning unit 1200 may provide a correction vector 1230. The correction vector may indicate a correction direction and correction amount for the pedestrian coordinates of each frame.

The corrected prediction trajectory 1004 can be provided by merging the initial prediction trajectory 1003 and the correction vector 1230. With the above-described device, an accurate trajectory as in reality may be generated by correcting the initial trajectory through the corrected trajectory learning unit 1200.

FIGS. 6(*a*), 6(*b*), 6(*c*), and 6(*d*) are views for describing a trajectory correction process as an example.

Referring to FIG. 6(*a*), a destination used in the initial prediction trajectory indicates that those within a predetermined distance from the ground truth (solid circles) are used and others are excluded, among the predicted destinations. Referring to FIG. 6(*b*), destinations within the predetermined distance from the ground truth are randomly added. Referring to FIG. 6(*c*), it can be seen that the initial predicted trajectory is linearly interpolated and appears in a straight line. Referring to FIG. 6(*d*), it can be seen that the corrected prediction trajectory is provided by adding the correction vector to the initial prediction trajectory.

Learning may be performed through the above-described process. A loss function used for learning may be provided to minimize the sum of the loss of the waypoint prediction and the loss of the corrected trajectory prediction. A scaling factor of the loss of the waypoint prediction and the loss of the corrected trajectory prediction may be set to 1.

The AI device provided as the above-mentioned device may predict a prediction trajectory immediately based on a trajectory along which the pedestrian has walked (e.g., the previous 8 frames). Accordingly, it is possible to prevent divergence of the trajectory due to the reference to the excessively long trajectory.

According to the embodiment, it can be seen that the strong social interaction model shows the actual interaction between pedestrians well. In addition, it can be seen that the accuracy of prediction can be improved by predicting not only the destination but also the midpoint.

The effects of the present disclosure will be described.

(Trajectory Estimation and Refinement Network)), good scores are obtained in almost all parts, and the best in average.

FIGS. 7(*a*), 7(*b*), 7(*c*), and 7(*d*) are views comparing the present disclosure with Social-STGCNN, which is a cited document, as an illustration of the effect of the present disclosure.

Referring to FIGS. 7(*a*), 7(*b*), 7(*c*), and 7(*d*), it can be seen that, in the present disclosure, the trajectory of the pedestrian is predicted more accurately.

The pedestrian trajectory can be predicted more accurately according to the present disclosure.

What is claimed is:

1. An automated method for controlling a self-driving vehicle, the method comprising:
   receiving, by one or more processors of the self-driving vehicle, sensing data from a sensing unit of the self-driving vehicle;
   detecting, by the one or more processors, a plurality of pedestrians from the received sensing data;
   predicting, by the one or more processors, corresponding trajectories of the detected pedestrians using the received sensing data; and
   controlling, by the one or more processors, the driving of the self-driving vehicle in response to the predicted pedestrian trajectories, wherein predicting the corresponding trajectories comprises:
   performing, by the one or more processors, a first learning for a plurality of waypoints on trajectories for pedestrians from a source to a destination; and
   performing, by the one or more processors, a second learning for a correction vector for correcting an initial prediction trajectory connecting the source and the destination,
   wherein the first learning includes:
      extracting, by the one or more processors, coordinates of a plurality of pedestrians from the trajectories for pedestrians from a source to a destination;
      creating, by the one or more processors, a spatio-temporal multi-relational pedestrian graphs of the plurality of pedestrians based on the coordinates of a plurality of pedestrians;

TABLE 1

|  | ETH | HOTEL | UNIV | ZARA1 | ZARA2 | AVG |
|---|---|---|---|---|---|---|
| Linear Regression | 1.33/2.94 | 0.39/0.72 | 0.82/1.59 | 0.62/1.21 | 0.77/1.48 | 0.79/1.59 |
| Social-LSTM | 1.09/2.35 | 0.79/1.76 | 0.67/1.40 | 0.47/1.00 | 0.56/1.17 | 0.72/1.54 |
| Social-GAN-P | 0.87/1.62 | 0.67/1.37 | 0.76/1.52 | 0.35/0.68 | 0.42/0.84 | 0.61/1.21 |
| SoPhie | 0.70/1.43 | 0.76/1.67 | 0.54/1.24 | 0.30/0.63 | 0.38/0.78 | 0.54/1.15 |
| PIF | 0.73/1.65 | 0.30/<u>0.59</u> | 0.60/1.27 | 0.38/0.81 | 0.31/0.68 | 0.46/1.00 |
| Reciprocal Learning | 0.69/1.24 | 0.43/0.87 | 0.53/1.17 | 0.28/0.61 | <u>0.28</u>/0.59 | 0.44/0.90 |
| STGAT | 0.65/1.12 | 0.35/0.66 | 0.52/1.10 | 0.34/0.69 | 0.29/0.60 | 0.43/0.83 |
| Social-BiGAT | 0.69/1.29 | 0.49/1.01 | 0.55/1.32 | 0.30/0.62 | 0.36/0.75 | 0.48/1.00 |
| Social-STGCNN | 0.64/1.11 | 0.49/0.85 | 0.44/0.79 | 0.34/0.53 | 0.30/0.48 | 0.44/0.75 |
| PECNet | <u>0.54</u>/<u>0.87</u> | <u>0.18</u>/0.24 | <u>0.35</u>/<u>0.60</u> | <u>0.22</u>/<u>0.39</u> | 0.17/0.30 | <u>0.29</u>/<u>0.48</u> |
| Graph-TERN | 0.42/0.58 | 0.14/0.24 | 0.27/0.48 | 0.21/0.37 | 0.17/<u>0.31</u> | 0.24/0.40 |

Referring to Table 1, horizontally, there are examples of various images, and vertically, other comparative examples are shown. A case of bold is the best case, and a case of underline is the second best case. In this case, it can be seen that in the case of the present disclosure (Graph-TERN updating, by the one or more processors, features by using the spatio-temporal multi-relational pedestrian graphs;
predicting, by the one or more processors, a plurality of waypoints probabilistically by multivariate gaussian mixture model, wherein the plurality of waypoints includes a first plurality of distributed waypoints adjacent of a first waypoint and a second plurality of distributed waypoints adjacent of a second waypoint;

connecting, by the one or more processors, the plurality of waypoints predicted in time series to provide a predicted destination; and providing, by the one or more processors, a plurality of predicted destinations, wherein the features include all relative displacement information (DP) between pedestrians, a reciprocal of the relative displacement information between pedestrians (1/DP), a distance information (DT) between pedestrians, and the reciprocal of the distance information between pedestrians (1/DT), and wherein the updated features use an equation of $$H' = \sigma\left( \sum_{\{r=1\}_r^{|\hat{R}|\{A\}}_H} W_r \right)$$

where H is the features of all nodes, nodes are all pedestrians, $\sigma$ is a nonlinear activation function, A is an adjacency matrix, W is a learnable weight matrix for each layer, R includes the relative displacement information (DP) between pedestrians, the reciprocal of the relative displacement information between pedestrians (1/DP), the distance information (DT) between pedestrians, and the reciprocal of the distance information between pedestrians (1/DT).

2. The method of claim 1, wherein a plurality of waypoints are defined as:

$$W'' = \{w_k^n = P_{T_{obs}+\tau \times k}^n - p_{T_{obs}+\tau \times (k-1)}^n\}$$

$$\text{for } \forall k \in \{1, \dots, K\}, \tau = \frac{T_{pred} - T_{obs}}{K}$$

where W is the plurality of waypoints, n is the pedestrian, K is the number of waypoints, T is a time point, and $\tau$ is a time interval.

3. The method of claim 2, wherein the K is 3.

4. The method of claim 1, wherein the updating feature includes:

updating, by the one or more processors, features on a spatial axis; and merging, by the one or more processors, updated on the spatial axis, on a time axis using a multi-relational merging unit implemented as a convolutional neural network layer.

5. The method of claim 1, wherein the initial prediction trajectory is a trajectory obtained by linear interpolation between the source and the predicted destinations.

6. The method of claim 5, wherein the plurality of predicted destinations are within a predetermined distance from a destination that is a ground truth among the predicted destinations provided by connecting the plurality of waypoints predicted, and a destination to which a sample within the predetermined distance from the destination that is the ground truth is added.

7. The method of claim 5, wherein the second learning includes:

updating, by the one or more processors, features of the initial prediction trajectory on a spatial axis; and merging, by the one or more processors, updated on the spatial axis, on a time axis.

8. The method of claim 1, further comprising:

providing, by the one or more processors, a corrected prediction trajectory by adding the correction vector to the initial prediction trajectory correction vector.

9. The method of claim 1, wherein the method is performed in real-time for autonomous vehicle navigation systems to enable collision avoidance and path planning.

10. The method of claim 1, wherein graph neural networks specifically configured for multi-pedestrian trajectory prediction are used to create the spatio-temporal multi-relational pedestrian graphs of the plurality of pedestrians based on the coordinates of the plurality of pedestrians, wherein the updating of the features using the spatio-temporal multi-relational pedestrian graphs transforms pedestrian spatial-temporal relationships into prediction-optimized feature representations, and wherein the predication of the plurality of waypoints probabilistically by multivariate gaussian mixture model are implemented through a mixture density network architecture.

11. The method of claim 1, wherein the method is performed in real-time for autonomous vehicle navigation systems.

12. An automated method for controlling a self-driving vehicle, the method comprising:

receiving, by one or more processors of the self-driving vehicle, sensing data from a sensing unit of the self-driving vehicle;

detecting, by the one or more processors, a plurality of pedestrians from the received sensing data;

predicting, by the one or more processors, corresponding trajectories of the detected pedestrians using the received sensing data; and controlling, by the one or more processors, the driving of the self-driving vehicle in response to the predicted pedestrian trajectories, wherein predicting the corresponding trajectories comprises:

performing, by the one or more processors, a first learning for a plurality of waypoints on trajectories along which pedestrians move from a source to a destination; and performing, by the one or more processors, a second learning for a correction vector for correcting an initial prediction trajectory connecting the source and the destination, wherein the first learning includes;

extracting, by the one or more processors, coordinates of a plurality of pedestrians from the trajectories for pedestrians from a source to a destination;

creating, by the one or more processors, a spatio-temporal multi-relational pedestrian graphs of the plurality of pedestrians based on the coordinates of a plurality of pedestrians;

updating, by the one or more processors, features by using the spatio-temporal multi-relational pedestrian graphs;

predicting, by the one or more processors, a plurality of waypoints probabilistically by multivariate gaussian mixture model, wherein the plurality of waypoints includes a first plurality of distributed waypoints adjacent of a first waypoint and a second plurality of distributed waypoints adjacent of a second waypoint;

connecting, by the one or more processors, the plurality of waypoints predicted in time series to provide a predicted destination; and providing, by the one or more processors, a plurality of predicted destinations, wherein the second learning includes:

updating, by the one or more processors, features of all the initial prediction trajectory on a spatial axis, the all the initial prediction trajectory is a trajectory obtained by interpolation between the source and the predicted destinations; and merging, by the one or more processors, the features updated on the spatial axis, on a time axis, wherein the features of the initial prediction trajectory includes all of relative displacement information (DP) between pedestrians, a reciprocal of the relative displacement information between pedestrians (1/DP), distance information (DT) between pedestrians, and a reciprocal of the distance information between pedestrians (1/DT).

13. The method of claim 12, wherein the initial prediction trajectory is a trajectory obtained by linear interpolation between the source and the predicted destinations.

14. The method of claim 12, wherein the predicted destinations includes a predicted destination within a predetermined distance from a destination that is a ground truth among the predicted destinations, and a destination to which a sample within the predetermined distance from the destination that is the ground truth is added.

15. The method of claim 12, wherein the initial prediction trajectory and the correction vector are added to provide a corrected prediction trajectory.

16. The method of claim 12, wherein the correction vector includes a correction direction and a correction amount for the pedestrian coordinates.

\* \* \* \* \*